United States Patent Office 2,838,776
Patented June 17, 1958

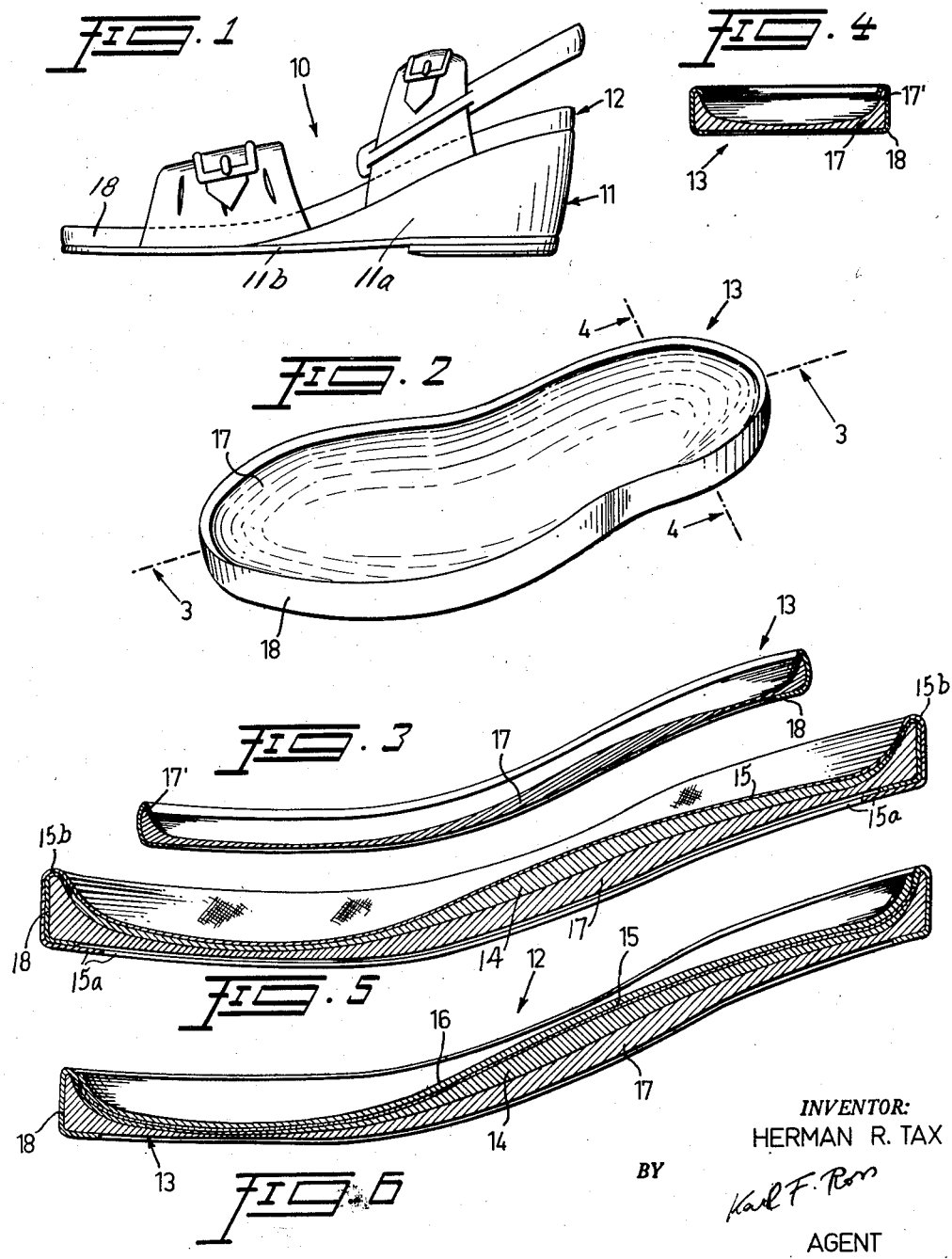

2,838,776

METHOD OF MAKING AN ORTHOPEDIC SHOE

Herman R. Tax, Westbury, N. Y.

Application December 3, 1954, Serial No. 472,819

2 Claims. (Cl. 12—142)

My present invention relates to a method of making an orthopedic shoe, e. g. one designed for the correction of fallen arches.

A principal object of my invention is to provide a method of making an orthopedic shoe having a foot-supporting portion shaped to conform to the greatest possible degree to the sole of the wearer, thereby enabling such shoe to be worn with a maximum of comfort and therapeutic effect.

Another object of my invention is to provide a method of dynamically molding the foot-supporting portion of such shoe under conditions of actual use, i. e. on the foot of the wearer over a prolonged period of routine activities such as walking, standing, climbing stairs and so forth.

A feature of my invention resides in the provision of a foot-supporting portion comprising a trough-shaped carrier partly filled with a pasty layer of a slowly hardening material, this layer being originally held in place by a yieldable covering which separates the plastic mass from the foot of the wearer during the molding period. After the mass has assumed its ultimate shape, the yieldable covering is replaced or supplemented by a permanent top sheet of leather or the like.

The above and other objects and features of my invention will become more fully apparent from the following detailed description of a specific embodiment, reference being had to the accompanying drawing in which:

Fig. 1 is a side elevational view of an orthopedic shoe according to the present invention;

Fig. 2 is a perspective view of a detachable insert, forming part of the shoe of Fig. 1, at a stage prior to the application of a plastic mass to such insert to convert same into the foot-supporting portion of the shoe;

Fig. 3 is a longitudinal sectional view of the insert of Fig. 2, taken on the line 3—3 of Fig. 2;

Fig. 4 is a transverse sectional view of the insert, taken on the line 4—4 of Fig. 2;

Fig. 5 is a view similar to Fig. 3 but drawn to a slightly larger scale, showing the completed insert at an intermediate stage of the formation of the shoe of Fig. 1; and Fig. 6 is a view similar to Fig. 5, showing the insert in its final form.

The shoe 10, Fig. 1, comprises a base portion 11, which in turn consists of a wedge 11a and a sole 11b, and a foot-supporting portion 12 which rests on the base 11 as an originally detachable insert of the shoe. In its ultimate form, shown in Fig. 6, this insert 12 comprises a trough-shaped carrier 13, a pasty mass forming a layer 14 above the somewhat arched bottom of this carrier, a piece of fabric 15 overlying the layer 14, and a top sheet or sock-lining 16 bonded onto the fabric 15.

The carrier 13, shown by itself in Figs. 2, 3 and 4, comprises a body 17 which is of increased thickness at the arch of the foot and is bounded by a peripheral lip 17', this lip being covered by a strip 18 of leather or leather-like material which also extends over the outer face and part of the bottom of body 17. The body 17 is preferably of cork, rubber or a combination of both. Fabric 15 may be a piece of coarsely woven material known as monk's cloth. Sheet 16 may also consist of leather or its equivalent and will be seen to overlap the strip 18 in Fig. 6.

The slowly hardening pasty mass constituting the layer 14 may be produced by mixing approximately equal parts of latex and wood flour. In the manufacture of my improved orthopedic shoe, this paste is spread over the upper surface of carrier 13 by the podiatrist who determines the required thickness of layer 14 according to the needs of the patient. Handling of the foot-supporting portion 12 during this operation is facilitated by the fact that the carrier 13 is originally separated from the shoe base 11. Next, a sheet of monk's cloth 15 somewhat larger than the area of the upper surface of carrier 13 is bonded onto the peripheral portion of carrier 13 (i. e. to the part covered by strip 18) by a suitable adhesive, such as rubber cement, which is also applied to the remainder of the cloth to make it substantially impervious to the material of layer 14; part of the monk's cloth is also adhered to the bottom of the carrier 13 at the margin thereof, as illustrated in Fig. 5. This process requires the monk's cloth to be pleated and pinched in order to conform to the round shape of the shoe insert 12; subsequently, all the tucks formed by the cloth 15 at the bottom of insert 12 are cut away to form a smooth underside 15a which can be readily cemented onto the wedge portion 11a of base 11. Since only a temporary bond between the insert 12 and the base 11 is desired at this time, only a thin annular zone along the edge of the base 11 and of the carrier 13 should be coated with adhesive at this stage, i. e. a region occupied by the marginal portion 15a of cloth 15 on the lower face of the insert.

The patient is now allowed to wear the shoe 10, with insert 12 therein, for a period of, say, from one to three days. During this period the still deformable mass of layer 14 adapts itself more closely to the shape of the foot, care having been taken to leave the top portion of sheet 15 loose enough to permit such adjustment. At the end of the period the pasty mass has hardened and the layer 14 has assumed its permanent form. It will be understood that the peripheral portions 15a, 15b of cloth 15 cemented to the underside and to the lip 17' of carrier body 17 serve to retain inside the cloth 15 any part of the mass 14 which may have been extruded, especially on the sides, from under the sole of the wearer during this molding operation.

The insert 12 is now again separated from the base 11 to permit the cutting away of all marginal portions of cloth 15, i. e. of the portions 15a and 15b shown in Fig. 5, thereby opposing the edge-finishing strip 18. The sheet 16 is then pasted onto the upper surface of cloth 15 to hide the latter and to complete the insert 12, as shown in Fig. 6, the latter being then firmly and permanently cemented onto the base 11.

It will be noted from the foregoing description that the carrier 13 serves the dual function of forming a mold for the shaping of layer 14, and of subsequently contributing to the support of the foot as part of the insert 12. It will also be understood that the mass of layer 14, of which the aforedescribed mixture of latex and wood flour is an example, must be firm enough so as not to yield under the weight of a sagging arch but must also be sufficiently deformable, prior to hardening, to respond to the natural muscular contractions and expansions of a foot in action. The invention is, of course, not limited to the specific composition disclosed, nor to the particular structure and operational steps described and

I claim:

1. The method of forming an orthopedic shoe which comprises the steps of depositing a plastic mass of moldable material on a sole-shaped carrier having an upstanding peripheral lip continuously therearound, placing a flexible covering upon said mass and around and beyond the entire side of said carrier so that a part of said covering extends over a marginal zone on the underside of said carrier and snugly engages said side and lip and holds said mass in place, adhesively securing said covering to said marginal zone, temporarily securing said carrier by adhesion only at said marginal zone to a base forming part of a shoe, conforming said mass to the natural shape of the sole of a patient by having the latter wear said shoe with said carrier therein over a period of sustained normal activity, detaching said carrier from said base, removing from said carrier the entire peripheral portion of said covering projecting beyond the upper carrier surface, permanently securing said carrier to said base, and placing a sock lining on the remaining part of said covering.

2. The method according to claim 1, comprising the further step of affixing an edge-finishing peripheral strip to the side of said carrier before extending said covering thereover, said strip being exposed upon the subsequent removal of said peripheral portion of said covering from said carrier.

References Cited in the file of this patent

UNITED STATES PATENTS

| | | |
|---|---|---|
| 1,856,394 | Lettermann | May 3, 1932 |
| 1,930,355 | Lettermann | Oct. 10, 1933 |
| 1,992,439 | Milner | Feb. 26, 1935 |
| 2,092,910 | Daniels | Sept. 14, 1937 |
| 2,136,815 | Forster et al. | Nov. 15, 1938 |
| 2,417,852 | Zerkle | Mar. 25, 1947 |
| 2,530,737 | Sherwin | Nov. 21, 1950 |

FOREIGN PATENTS

| | | |
|---|---|---|
| 850,299 | France | Sept. 4, 1939 |